US009773191B2

(12) United States Patent
Liu et al.

(10) Patent No.: US 9,773,191 B2
(45) Date of Patent: Sep. 26, 2017

(54) VIDEO PROCESSING METHOD AND SYSTEM

(71) Applicant: VIVOTEK INC., New Taipei (TW)

(72) Inventors: Yui-Juin Liu, New Taipei (TW); Chih-Chiang Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 470 days.

(21) Appl. No.: 14/333,860

(22) Filed: Jul. 17, 2014

(65) Prior Publication Data

US 2015/0022629 A1 Jan. 22, 2015

(30) Foreign Application Priority Data

Jul. 17, 2013 (TW) .............................. 102125577 A

(51) Int. Cl.
| | |
|---|---|
| *H04N 7/00* | (2011.01) |
| *G06K 9/62* | (2006.01) |
| *H04N 5/232* | (2006.01) |
| *G06K 9/00* | (2006.01) |
| *G06K 9/36* | (2006.01) |

(52) U.S. Cl.
CPC ....... *G06K 9/6202* (2013.01); *G06K 9/00771* (2013.01); *H04N 5/232* (2013.01); *G06K 2009/363* (2013.01)

(58) Field of Classification Search
CPC ............. G06K 9/6202; G06K 9/00771; G06K 2009/363; H04N 5/232
USPC .......................................................... 348/37
See application file for complete search history.

(56) References Cited

U.S. PATENT DOCUMENTS

| | | | | |
|---|---|---|---|---|
| 2006/0072663 A1* | 4/2006 | Li | ......................... | H04N 19/513 375/240.16 |
| 2013/0071012 A1* | 3/2013 | Leichsenring | ........... | G06K 9/80 382/154 |
| 2013/0129144 A1* | 5/2013 | Chang | ...................... | G06K 9/62 382/103 |
| 2013/0148861 A1* | 6/2013 | Ferlatte | .............. | G06K 9/00724 382/107 |

FOREIGN PATENT DOCUMENTS

EP 2570962 A1 3/2013

\* cited by examiner

*Primary Examiner* — Allen Wong
(74) *Attorney, Agent, or Firm* — Maschoff Brennan

(57) ABSTRACT

A video processing method and a video processing system are provided. The video processing method is applied to a rotary video capturing device. The video processing method includes the following steps. First, at least one video frame corresponding to at least one piece of field-of-view (FOV) information is received, and a plurality of first coordinates corresponding to a plurality of first pixels of the at least one video frame is obtained. Coordinate transformation procedure is performed on the first coordinates according to the at least one piece of FOV information to obtain a plurality of second coordinates. A plurality of second pixels in a panoramic background image corresponding to the second coordinates is obtained. The first pixels are compared with the second pixels to determine whether the first pixels belong to a foreground or a background, to output comparison results.

10 Claims, 6 Drawing Sheets

VIDEO PROCESSING METHOD AND SYSTEM

CROSS-REFERENCE TO RELATED APPLICATIONS

This non-provisional application claims priority under 35 U.S.C. §119(a) on Patent Application No(s). 102125577 filed in Taiwan, R.O.C. on Jul. 17, 2013, the entire contents of which are hereby incorporated by reference.

TECHNICAL FIELD

The disclosure relates to a video processing method and a video processing system using the same, more particularly to a video processing method and a video processing system using the same, applied to a rotary video capturing device.

BACKGROUND

The object detection technology applied to video surveillance nowadays has two common ways: one is to detect the predefined specific objects in the image and the other one is to subtract background image from a current image to obtain foreground.

The object detection based on background subtraction needs to collect a great deal of background image and then statistically analyze the collected image to produce static and effective background image. After that, the background image will continuously be updated by every current image to automatically vary with time.

Nevertheless, when rotary video capturing devices, such as pan-tilt surveillance cameras or pan-tilt-zoom surveillance cameras, patrol in different view positions, the field of view of captured images will change. When the background image of the field of view in the current view position is not learnt and converged to become stable and the rotary video capturing device moves to next view position, the object detection will output an invalid result or continue outputting wrong results.

SUMMARY

According to one or more embodiments, the disclosure provides a video processing method. In one embodiment, the video processing method may be applied to a rotary video capturing device and include the following steps. First, receive at least one video frame corresponding to at least one piece of field-of-view information, and obtain a plurality of first coordinates corresponding to a plurality of first pixels in the at least one video frame. Then, perform a coordinate transformation procedure on the first coordinates to obtain a plurality of second coordinates according to the at least one piece of field-of-view information, and obtain a plurality of second pixels in a panoramic background image corresponding to the second coordinates. Finally, compare the first pixels with the second pixels to determine that the first pixels belong to a foreground or a background, and to obtain and output a plurality of comparison results.

According to one or more embodiments, the disclosure provides a video processing system. In one embodiment, the video processing system may include a storage device and a rotary video capturing device. The storage device may store a panoramic background image and at least one piece of field-of-view information. The rotary video capturing device may be coupled to the storage device and include at least one video capturing unit and a processing unit. The video capturing unit may capture at least one video frame corresponding to the at least one piece of field-of-view information. The processing unit may receive the at least one video frame and the at least one piece of field-of-view information to obtain a plurality of first coordinates corresponding to a plurality of first pixels in the at least one video frame. Also, the processing unit may perform the coordinate transformation procedure on the first coordinates to obtain a plurality of second coordinates according to the at least one piece of field-of-view information. The processing unit may obtain a plurality of second pixels in a panoramic background image corresponding to the second coordinates and compare the first pixel with the second pixel to determine whether the first pixel belongs to a foreground or a background, to obtain and output a plurality of comparison results.

According to one or more embodiments, the disclosure also provides another video processing method. In one embodiment, the video processing method may be applied to a rotary video capturing device and include the following steps. First, receive at least one video frame corresponding to at least one piece of field-of-view information. Then, obtain at least one background image corresponding to the at least one piece of field-of-view information. Finally, compare the at least one video frame with the at least one background image to perform foreground detection and background learning-and-updating.

According to one or more embodiments, the disclosure also provides another video processing system. In one embodiment, the video processing system may include a storage device and a rotary video capturing device. The storage device may store at least one background image and at least one piece of field-of-view information corresponding to the at least one background image. The rotary video capturing device may be coupled to the storage device and include at least one video capturing unit and a processing unit. The video capturing unit may capture at least one video frame corresponding to the at least one piece of field-of-view information. The processing unit may receive the at least one video frame and the at least one piece of field-of-view information, obtain the at least one background image from the storage device according to the at least one piece of field-of-view information, and compare the at least one video frame with the at least one background image, to perform foreground detection and background learning-and-updating.

BRIEF DESCRIPTION OF THE DRAWINGS

The present disclosure will become more fully understood from the detailed description given herein below for illustration only and thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
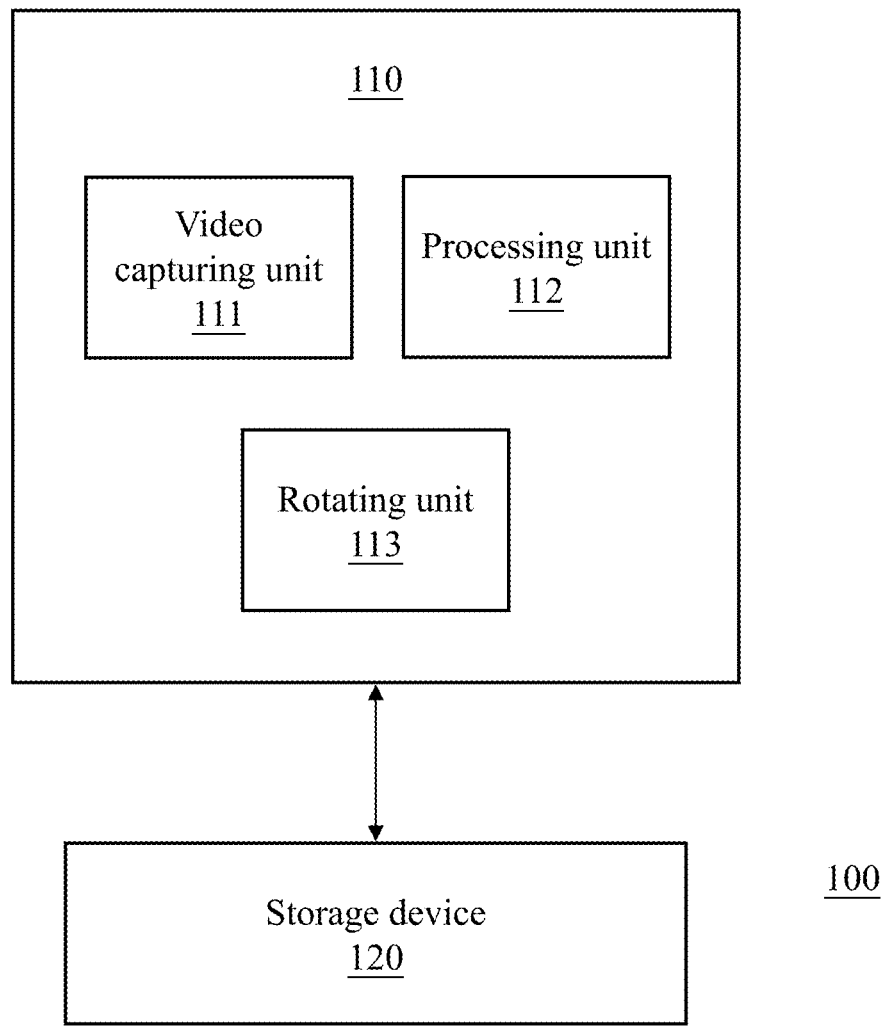
FIG. 1 is a block diagram of an embodiment of a video processing system in the disclosure.

Referring to FIG. 1, a video processing system 100 is shown according to an embodiment of the disclosure. The video processing system 100 may include a storage device 120 and a rotary video capturing device 110. The storage device 120 may store data or messages produced by the rotary video capturing device 110. For example, the storage device 120 may be an external hard disk drive, a non-volatile memory (NVRAM) or a memory card.

In this embodiment, the rotary video capturing device 110 may couple with the storage device 120 wiredly or wirelessly. In other words, the rotary video capturing device 110 and the storage device 120 may disposed separately as shown in FIG. 1. In some embodiments, the storage device 120 may be built in the rotary video capturing device 110 or may be plugged in a slot of the rotary video capturing device 110.

In one or some embodiments, the rotary video capturing device 110 may be a pan-tilt network camera, a pan-tilt-zoom network camera, a speed dome network camera, any possible rotatable network camera or any possible rotatable closed circuit television (CCTV) camera.

The rotary video capturing device 110 may include a video capturing unit 111, a processing unit 112, and a rotating unit 113. In one embodiment, the video capturing unit 111 may include an image sensor and a lens module to capture objects and zoom in/out. In one embodiment, the processing unit 112 may be a central processing unit (CPU) for operating image outputted by the video capturing unit 111. In one embodiment, the rotating unit 113 may include gears and a motor and operate in response to the control of the processing unit 112 to change the angle of shot of the video capturing unit 111 to capture images in different fields of view. In this embodiment, there is only one video capturing unit 111. In some embodiments, the amount of video capturing units 111 may be two or more than two in accordance with user's application requirements.

The inner components of the video processing system 100 and their connection relationship are simply illustrated in the above description. The operation of the video processing system 100 is described in a video processing method shown in FIG. 2.

Figure 2:
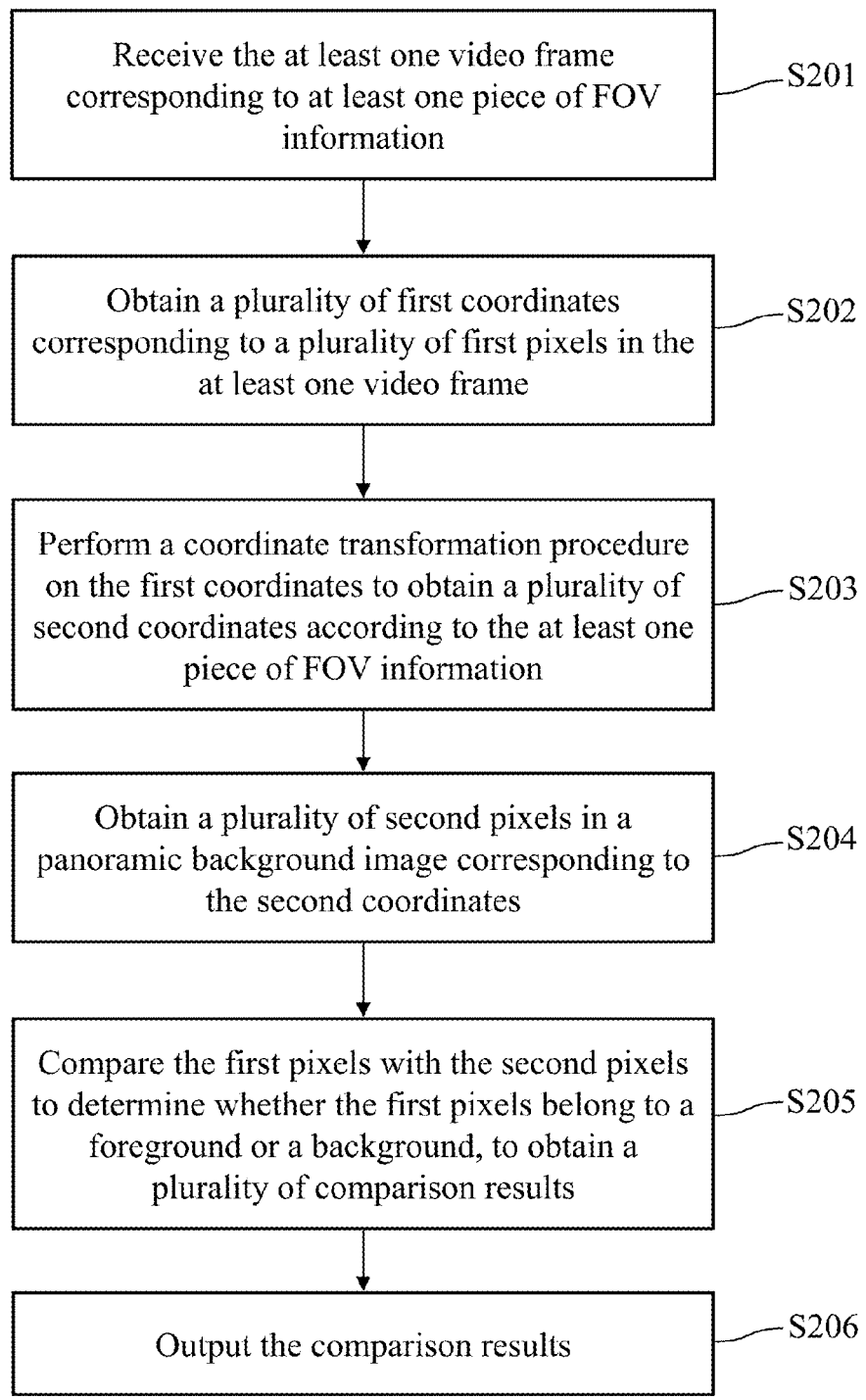
FIG. 2 is a flow chart of an embodiment of a video processing method in the disclosure.

FIG. 2 is a flow chart of an embodiment of a video processing method in the disclosure. First, the video capturing unit 111 may perform video capture to obtain and output at least one video frame. The processing unit 112 may receive the at least one video frame corresponding to at least one piece of field-of-view information (step S201). In this or some embodiments, the aforementioned video frame may correspond to an angle of shot referred to the video capturing unit 111 rotated by the rotating unit 113 controlled by the processing unit 112. In this or some embodiments, the aforementioned field-of-view information may include information of horizontal movement, vertical movement and/or zoom in/out associated with the video capturing unit 111, and be stored in the storage device 120.

Subsequently, the processing unit 112 may obtain a plurality of first coordinates corresponding to a plurality of first pixels in the at least one video frame (step S202). In this or some embodiments, the aforementioned first pixels may be all pixels of the video frame, and the aforementioned first coordinates may be coordinates of all pixels of the video frame.

Following step S202, the processing unit 112 may perform a coordinate transformation procedure on the first coordinates to obtain a plurality of second coordinates according to the at least one piece of field-of-view information (step S203). In detail, in one embodiment of step S203, the processing unit 112 may perform the coordinate transformation procedure according to the information of horizontal movement, vertical movement and zoom in/out in the field-of-view information. In another embodiment of step S203, the processing unit 112 may perform the coordinate transformation procedure according to the information of horizontal movement and vertical movement in the field-of-view information. Moreover, the aforementioned coordinate transformation procedure may function to transform image coordinates to a panoramic coordinate system in this or some embodiments, that is, the second coordinates produced by transforming the first coordinates may be the panoramic coordinate.

Subsequently, after the processing unit 112 may obtain a plurality of second pixels in a panoramic background image corresponding to the second coordinates (step S204), the processing unit 112 may compare the first pixels with the second pixels to determine whether the first pixels belong to a foreground or a background, to obtain a plurality of comparison results (step S205). Specifically, the processing unit 112 may compare each first pixel with each second pixel having the same coordinate as this first pixel, to determine each first pixel to belong to the foreground or the background.

In one embodiment, the processing unit 112 may perform pixel comparison by the pixel-based or region-based manner. In this case, the processing unit 112 may find out abnormal vectors by the motion vector estimation and then find out pixels or pixel region belonging to the foreground. For the pixel-based manner, the processing unit 112 may know the change on pixels by the Gaussian model to determine the first pixels as the foreground or background. For the region-based manner, the processing unit 112 may acquire the image features in a fixed region and then compare the image features with the region in the panoramic image that corresponds to the image features, to determine the first pixels as the foreground or background.

Following step S205, the processing unit 112 may output the comparison results (step S206).

After outputting the comparison results, the processing unit 112 may further collect information about the first pixels belonging to the foreground to produce foreground information, i.e. complete foreground information. Moreover, the processing unit 112 may also utilize the first pixels to perform background learning-and-updating on the panoramic background image.

Figure 3:
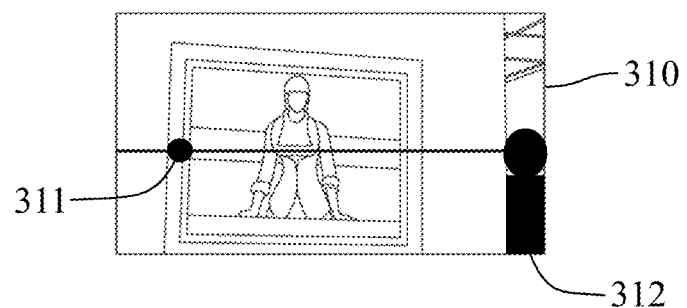
FIG. 3 is an exemplary diagram of a video frame which a coordinate transformation procedure has not been performed on according to an embodiment.
Figure 4:
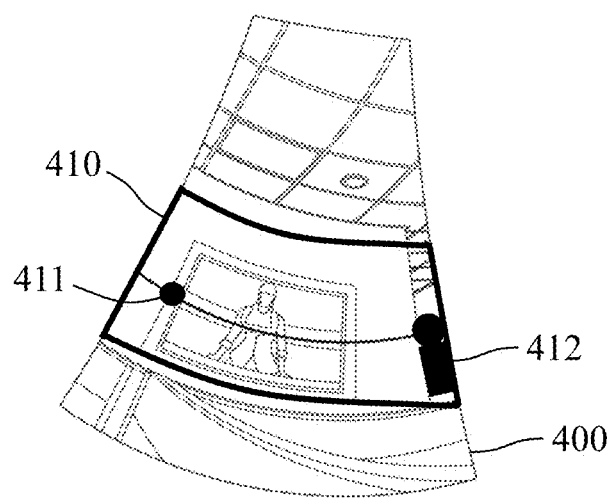
FIG. 4 is an exemplary diagram of a partial region of a panoramic background image for a video frame which a coordinate transformation procedure has been performed on according to an embodiment.

In order to clearly describe the video processing, some exemplary embodiments may be taken as follows for this illustration purpose. FIG. 3 is an exemplary diagram of a video frame which a coordinate transformation procedure has not been performed on according to an embodiment. FIG. 4 is an exemplary diagram of a partial region of a panoramic background image for a video frame which a coordinate transformation procedure has been performed on according to an embodiment. In FIG. 3, the label 310 indicates a video frame that the coordinate transformation procedure has not been performed on, the label 311 indicates a coordinate point at the first coordinate, and the label 312 indicates a foreground object that the coordinate transformation procedure has not been performed on. In FIG. 4, the label 400 indicates a partial region of the panoramic background image, the label 410 indicates a video frame which the coordinate transformation procedure has been performed on, the label 411 indicates a coordinate point at the second coordinate, and the label 412 indicates a foreground object that the coordinate transformation procedure has been performed on.

First at all, the video capturing unit 111 may capture a video frame 310 corresponding to the field-of-view information whose horizontal movement may be, for example, 60 degrees and whose vertical movement may be, for example, 30 degrees. After receiving the video frame 310, the processing unit 112 may obtain the coordinate of the first coordinate point 311 corresponding to the first pixel of the video frame 310.

Then, the processing unit 112 may perform a coordinate transformation procedure on the coordinate of the first coordinate point 311 to obtain the coordinate of the second coordinate point 411 in the panoramic coordinate system according to the field-of-view information. The location of the second coordinate point 411 may correspond to that of the first coordinate point 311.

The coordinate transformation procedure to transform the image coordinate system to the panoramic coordinate system may be described in the following exemplary embodiment.

First, acquire a coordinate (x1,y1) of the first coordinate point 311 in the video frame 310 and a coordinate $(x_{c1},y_{c1})$ of a centroid of the video frame 310. Then, a coordinate $(pan_{c1}, tilt_{c1})$ of a centroid of the video frame 410 corresponding to the centroid of the video frame 310, and the current lens focal length information (λ1) may be looked up in hardware information. Next, according to the above information, a coordinate $(pan_{c1}, tilt_{c1})$ of the second coordinate point 411 corresponding to the coordinate (x1,y1) may be calculated by Trigonometric functions. The coordinate (x1,y1) and the coordinate $(x_{c1},y_{c1})$ may belong to the image coordinate system, and the coordinate $(pan_{c1}, tilt_{c1})$ and the coordinate (pan1, tilt1) may belong to the panoramic coordinate system.

Finally, the processing unit 112 may acquire second pixels corresponding to the second coordinate points 411 and compare the first pixels with the second pixels to determine the first pixels as a foreground or a background to obtain comparison results.

Figure 5:
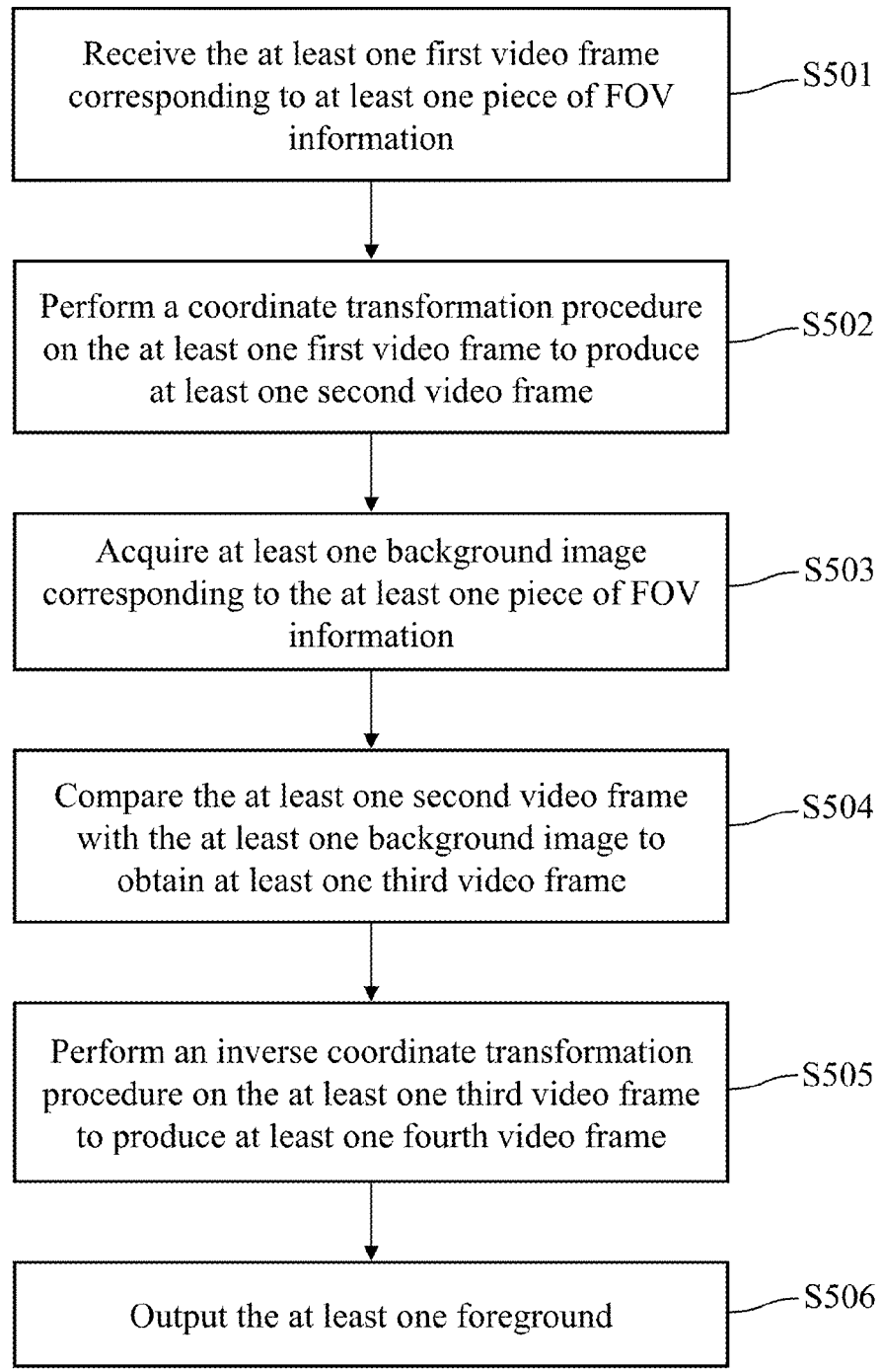
FIG. 5 is a flow chart of another embodiment of a video processing method in the disclosure.
Figure 6:
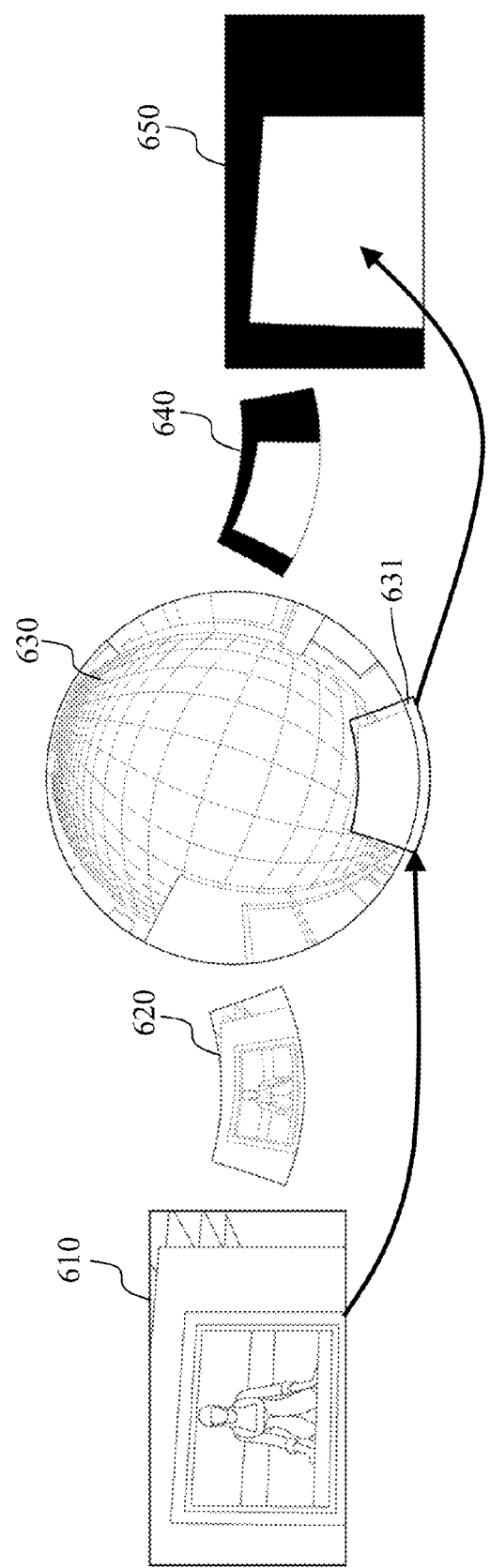
FIG. 6 is an exemplary diagram showing a video processing method according to an embodiment.

Referring to FIG. 5 and FIG. 6, a video processing method is shown according to another embodiment. First, the video capturing unit 111 may perform video capture to obtain and output at least one first video frame 610. Next, the processing unit 112 may receive the at least one first video frame 610 corresponding to at least one piece of field-of-view information (step S501). The at least one first video frame 610 may correspond to an angle of shot of the video capturing unit 111 rotated by the rotating unit 113 controlled by the processing unit 112. The field-of-view information may include information of horizontal movement, vertical movement and/or zoom in/out associated with the video capturing unit 111 and may be stored in the storage device 120.

Then, the processing unit 112 may perform a coordinate transformation procedure on the at least one first video frame 610 to produce at least one second video frame 620 (step S502). The coordinate transformation procedure to transform the first video frame 610 into the second video frame 620 may be referred to the coordinate transformation procedure to transform the video frame 310 into the video frame 410 as shown in FIG. 3 and FIG. 4, and will not be repeated hereinafter.

Subsequently, the processing unit 112 may acquire at least one background image 631 corresponding to the at least one piece of field-of-view information (step S503). The at least one background image 631 may be a partial region of a panoramic background image 630 and stored in the storage device 120. The processing unit 112 may further compare the at least one second video frame 620 with the at least one background image 631 to obtain at least one third video frame 640 (step S504). Next, the processing unit 112 may perform an inverse coordinate transformation procedure on the at least one third video frame 640 to produce at least one fourth video frame 650 presenting the foreground (step S505).

An exemplary embodiment of the inverse coordinate transformation procedure to transform the panoramic coordinate system into the image coordinate system may be demonstrated as follows.

First, a coordinate (pan2,tilt2) of a third coordinate point in the third video frame 640 may be acquired. Also, a coordinate $(pan_{c2},tilt_{c2})$ of the centroid of the third video frame 640 and the current lens focal length information (λ2) may be acquired by looking them up in hardware information. Then, the location information about a fourth coordinate point relative to the centroid of the fourth video frame 650 may be calculated by Trigonometric functions. The fourth coordinate point of the fourth video frame 650 is corresponding to the third coordinate point. The centroid of the fourth video frame 650 is the same as the centroid of the first video frame. Therefore, the coordinate (x2,y2) of the fourth coordinate point may be calculated by the above information. The coordinate (x2,y2) may belong to the image coordinate system, and the coordinate (pan2,tilt2) and the coordinate $(pan_{c2},tilt_{c2})$ may belong to the panoramic coordinate system.

Then, the processing unit 112 may output the at least one foreground 650 (step S506). Comparing the video frame with the background image by the processing unit 112 may be referred to the above one or more embodiments and will not be repeated hereinafter. Moreover, the processing unit 112 may further utilize the at least one second video frame 620 to update the background region 631 of the panoramic background image 630 in the storage device 120.

In the above one or more embodiments, the coordinate transformation procedure may be required.

Figure 7:
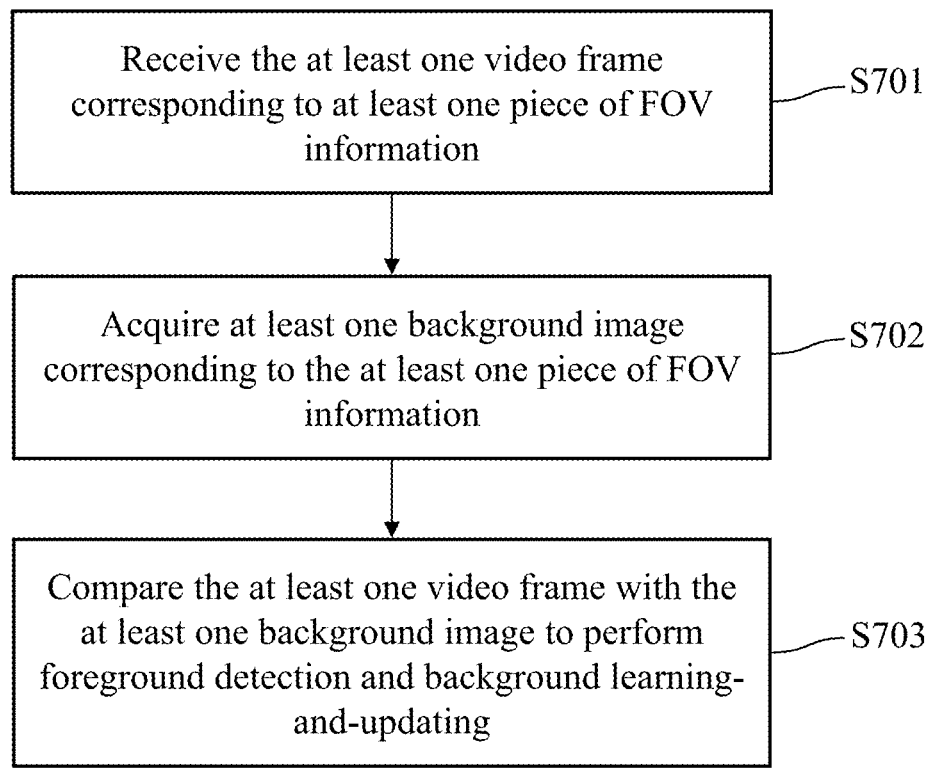
FIG. 7 is a flow chart of another embodiment of a video processing method in the disclosure.

In order to save operation time or apply the disclosure in a certain device with lower computing capability, the disclosure also provides another video processing method. FIG. 7 is a flow chart of another embodiment of a video processing method in the disclosure. First, the video capturing unit 111 may perform video capture to obtain and output at least one video frame. Then, the processing unit 112 may receive the at least one video frame that may correspond to at least one piece of field-of-view information (step S701). The video frame may correspond to the angle of shot of the video capturing unit 111 rotated by the rotating unit 113 controlled by the processing unit 112. The field-of-view information may include information of horizontal movement, vertical movement and/or zoom in/out associated with the video capturing unit 111.

Then, the processing unit 112 may acquire at least one background image corresponding to the at least one piece of field-of-view information (step S702), and may compare the at least one video frame with the at least one background image to perform foreground detection and background learning-and-updating (step S703). The process to compare the video frame with the background image by the processing unit 112 can be referred to the above relative description and will not be repeated hereinafter.

In this embodiment, it requires some memory space to store the background image and the corresponding field-of-view information referred to one field of view. The device having a limited memory space may be able to establish a pair of field-of-view information and a background image for each view position and then perform the foreground detection and the background learning-and-updating for each view position.

In brief, the video processing method and the video processing system may receive at least one video frame corresponding to at least one piece of field-of-view information, acquire a plurality of first coordinates corresponding to a plurality of first pixels in the at least one video frame, and perform a coordinate transformation procedure on the first coordinates to obtain a plurality of second coordinates. Then, after a plurality of second pixels of a panoramic background image corresponding to the second coordinates is obtained, the first pixels may be compared with the second pixels to determine the first pixels as a foreground or background to produce and output a plurality of comparison results. The comparison results may further be used for performing foreground detection and background learning-and-updating. In this way, even if the angle of shot is changed, the foreground object will still be detected.

On the other hand, the simpler video processing method and video processing system without the coordinate transformation procedure may acquire at least one background image corresponding to at least one piece of field-of-view information and then compare at least one video frame with the at least one background image to perform foreground detection and background learning-and-updating. Therefore, more memory space may be utilized to efficiently avoid failure to detect the foreground object when the angle of shot is changed.

What is claimed is:

1. A video processing method, applied to a rotary video capturing device and comprising:
    receiving at least one video frame corresponding to at least one piece of field-of-view information;
    obtaining a plurality of first coordinates corresponding to a plurality of first pixels of the at least one video frame;
    performing a coordinate transformation procedure on the plurality of first coordinates to obtain a plurality of second coordinates according to the at least one piece of field-of-view information;
    obtaining a plurality of second pixels in a panoramic background image corresponding to the plurality of second coordinates;
    comparing the plurality of first pixels with the plurality of second pixels to determine that the plurality of first pixels belongs to a foreground or a background, to produce a plurality of comparison results; and
    outputting the plurality of comparison results.

2. The video processing method according to claim 1, wherein the at least one piece of field-of-view information comprises horizontal movement and vertical movement.

3. The video processing method according to claim 1, wherein the coordinate transformation procedure functions to transform image coordinates to a panoramic coordinate system.

4. The video processing method according to claim 1, further comprising: performing background learning-and-updating on the panoramic background image via the plurality of first pixels.

5. The video processing method according to claim 1, further comprising: combining information about the plurality of first pixels belonging to the foreground to produce foreground information.

6. A video processing system, comprising:
    a storage device, configured to store a panoramic background image and at least one piece of field-of-view information; and
    a rotary video capturing device, coupled to the storage device and comprising:
    at least one video capturing unit, configured to capture at least one video frame corresponding to the at least one piece of field-of-view information; and
    a processing unit, configured to perform steps of:
    receiving the at least one video frame and at least one piece of field-of-view information;
    obtaining a plurality of first coordinates corresponding to a plurality of first pixels in the at least one video frame;
    performing a coordinate transformation procedure on the plurality of first coordinates to obtain a plurality of second coordinates according to the at least one piece of field-of-view information;
    obtaining a plurality of second pixels in a panoramic background image corresponding to the plurality of second coordinates;
    comparing the plurality of first pixels with the plurality of second pixels to determine that the plurality of first pixels belongs to a foreground or a background, to produce a plurality of comparison results; and
    outputting the plurality of comparison results.

7. The video processing system according to claim 6, wherein the at least one piece of field-of-view information comprises horizontal movement and vertical movement.

8. The video processing system according to claim 6, wherein the coordinate transformation procedure functions to transform image coordinates to a panoramic coordinate system.

9. The video processing system according to claim 6, wherein the processing unit further performs background learning-and-updating on the panoramic background image via the plurality of first pixels.

10. The video processing system according to claim 6, wherein the processing unit further combines information about the plurality of first pixels belonging to the foreground to produce foreground information.

* * * * *